Figure 1:
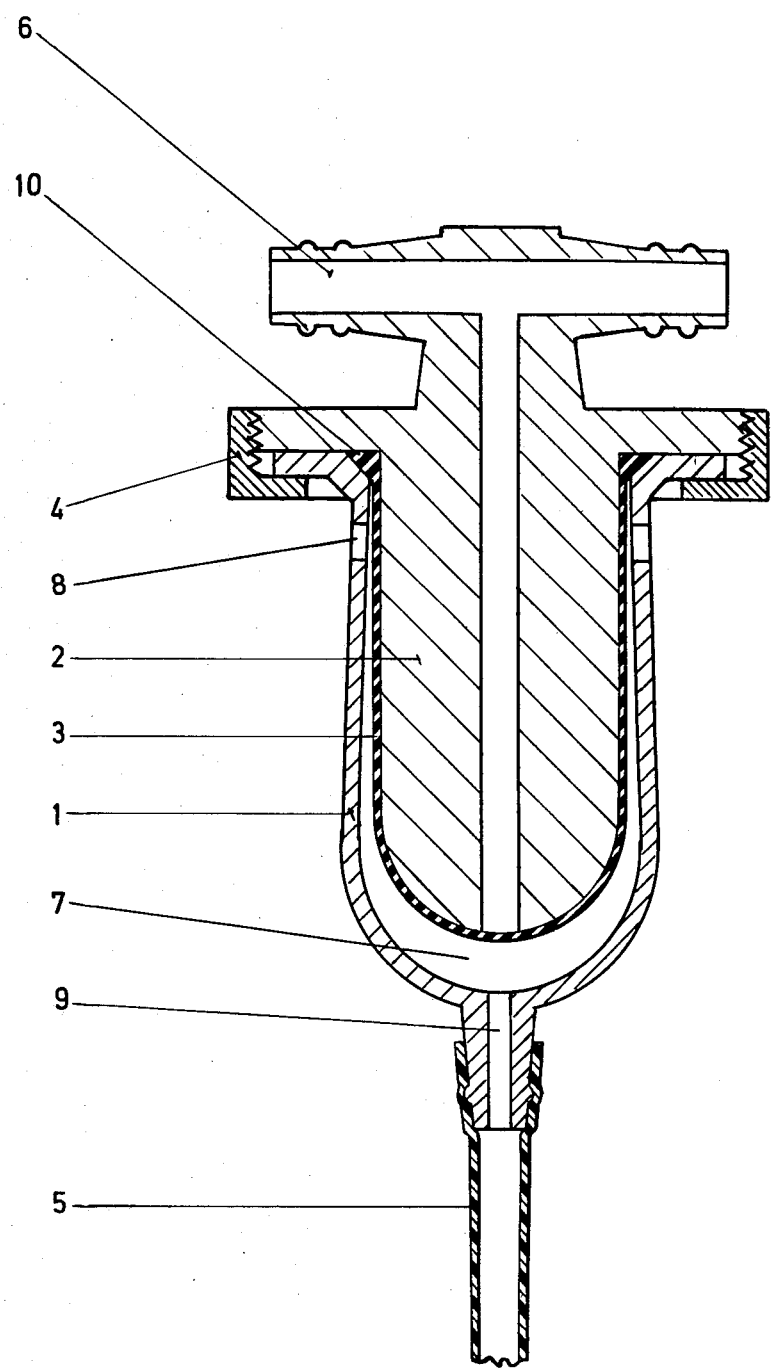

United States Patent [19]

Schmechtig

[11] 4,269,906
[45] May 26, 1981

[54] PUMP DEVICE

[75] Inventor: Rune Schmechtig, Nol, Sweden

[73] Assignee: Aktiebolaget Tudor, Sundbyberg, Sweden

[21] Appl. No.: 941,790

[22] Filed: Sep. 12, 1978

[30] Foreign Application Priority Data

Sep. 12, 1977 [SE] Sweden .................. 7710182

[51] Int. Cl.³ .................. H01M 2/38; F04B 45/00
[52] U.S. Cl. .................. 429/67; 417/383; 417/394; 92/90
[58] Field of Search ............. 417/383, 389, 394, 395; 92/90; 429/67, 70

[56] References Cited

U.S. PATENT DOCUMENTS

| 1,503,279 | 7/1924 | Nixon | 417/394 |
|---|---|---|---|
| 3,022,737 | 2/1962 | Tuckey | 417/394 X |
| 3,586,462 | 6/1971 | Kaiser et al. | 417/394 |
| 3,807,906 | 4/1974 | Breit | 417/63 X |

FOREIGN PATENT DOCUMENTS

| 2211096 | 9/1973 | Fed. Rep. of Germany | 417/413 |
|---|---|---|---|
| 226673 | 6/1969 | Sweden | 417/389 |
| 494534 | 12/1975 | U.S.S.R. | 417/395 |

Primary Examiner—Leonard E. Smith
Attorney, Agent, or Firm—Burns, Doane, Swecker & Mathis

[57] ABSTRACT

A pump device for intermittently pumping fluid, comprises a pump house having a primary portion and a secondary portion forming a space therebetween. The pump house includes an inlet opening for admitting fluid into the space and an outlet opening. An elastic membrane is disposed in the space between the primary and secondary parts and includes a secondary side facing the inlet and outlet openings. Pulsating pressure waves are applied against the membrane for displacing the membrane such that the secondary side thereof initially closes the inlet opening and thereafter expresses fluid from the space through the outlet opening.

5 Claims, 2 Drawing Figures

PUMP DEVICE

BACKGROUND AND OBJECTS OF THE INVENTION

This invention relates to a pump device for obtaining an intermittent pumping or circulation of a fluid.

Pumping devices are known which circulate gas or liquid. In certain cases it is desired to produce simultaneous circulation of fluid in a number of jars, where the fluid in each jar has no connection with that of another jar. One example of such a case is a multicelled accumulator battery, where air is pumped into the electrolyte, and bubbled up through the electrolyte to cause circulation of the electrolyte. One prior proposal of hitherto used devices for this purpose, is described in Swedish Pat. No. 226.673. Accumulator cells are also an example of a case wherein the circulating medium shall not be taken from outside the jar, but only from within the jar.

It is an object of the present invention to provide a novel fluid pump.

It is another object of the invention to provide a novel battery pump which circulates fluid from within a battery jar.

BRIEF SUMMARY OF THE INVENTION

The pump devices according to the invention have an elastic membrane, which is influenced on its primary side by a variable pressure. When pressure is increased, the secondary side of the membrane initially closes the inlet openings and after that forces the fluid in the pump house out through the outlet openings. The pressure increase is preferably obtained by another pump, a primary one, which generates compressed air in regularly varying pulses. The variations of the pressure can also be transmitted by another medium, for example oil. They can also be obtained by mechanical means. The membrane is suitably designed like a bladder, whereby the inside of the membrane is the primary side and the outside of the membrane is the secondary side. The design of the pump house is preferably worked out in such a way that the distance between its primary and secondary parts is longer at the outlets than at the inlets. It can also be suitable that the membrane, which consists of homogeneous material, is thicker in that part which covers the outlet openings, than in that part which covers the inlet openings.

THE DRAWING

The invention shall further be described in and by the following statement in connection with the drawings.

Figure 2:
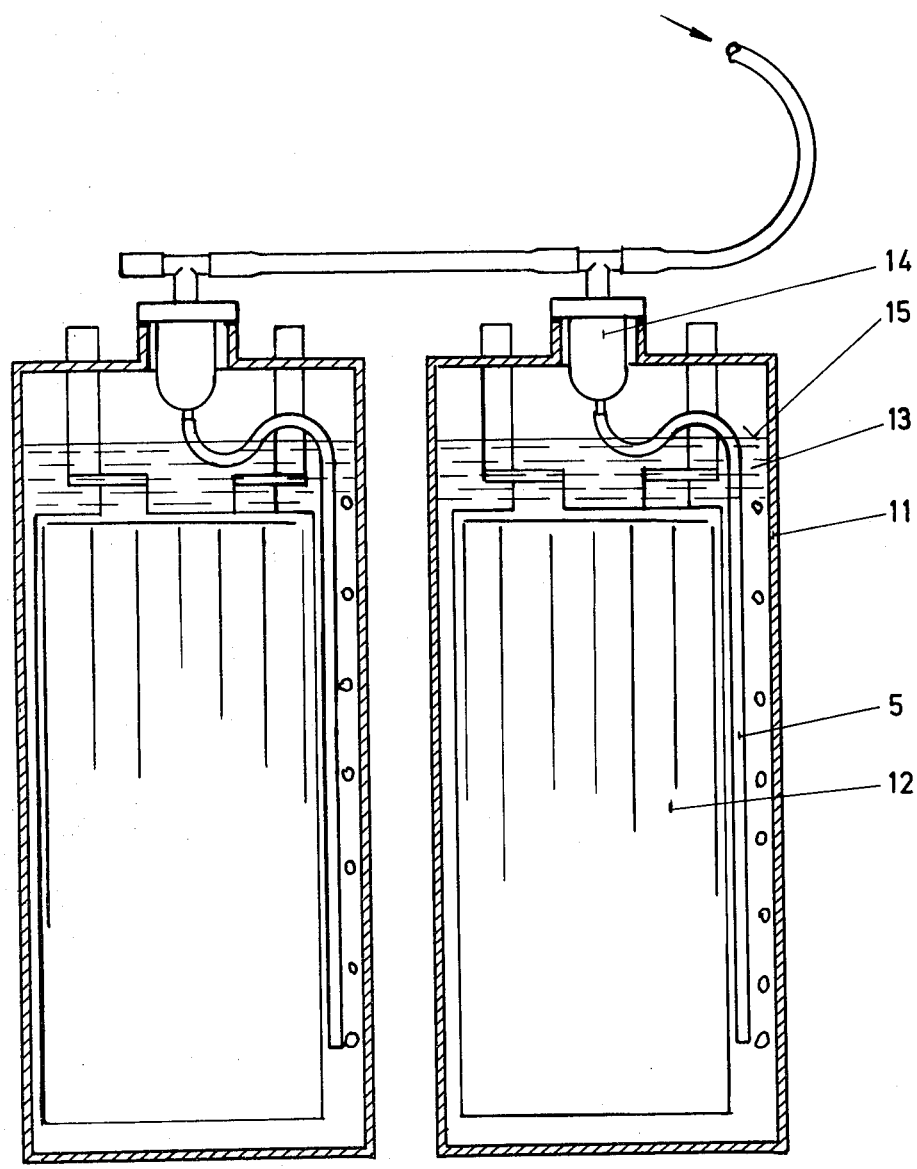

In FIG. 1, a preferred embodiment of the invention is illustrated in longitudinal cross-section and in FIG. 2 an example of an application of the preferred pump is illustrated.

DETAILED DESCRIBED OF A PREFERRED EMBODIMENT OF THE INVENTION

The pump device comprises a pump house with two parts, viz., a primary part 2 and a secondary part 1. The housing parts 1, 2 are held together by a connecting element 4 in the form of a sleeve which is threadedly connected to the primary housing part 2. Between the two parts of the pump house, there is disposed a flexible membrane 3 characterized as a bladder, which along its edge 10 is clamped between the two parts of the pump house. A primary side of the membrane faces the primary part and a secondary side of the membrane faces the secondary part. The primary part 2 of the pump house is provided with channels 6 for connection with a device for generating compressed air pulses with a regular frequency, and also possibly with another pump. The secondary part 1 of the pumphouse is of U-shaped cross-section and includes two inlet openings 8 at an upper portion thereof. The membrane 3 is wrapped around the primary part and extends over the terminal end of the channel 6 and above the inlet openings 8. The secondary part has two inlet openings 8 and one outlet opening 9. The figure shows the pump device in a position of rest, i.e., the primary side of the membrane is no longer influenced by an overpressure. Between the two parts of the pump house, there is a space 7, within which the membrane can expand. The depth of the space 7 between the parts of the pump house is largest at the outlet opening 9 and essentially smaller at the inlets 8. That portion of the space 7 between the membrane 3 and the secondary part 2 may be considered as a working space, the depth of which progressively increases from the inlets to the outlet. The location and number of the outlet and inlet openings can of course be varied within the scope of the invention and in the described embodiment, a number of inlet openings may, for example, be placed in a circle around the secondary part of the pump house. Also, the design of the channels in the secondary part may vary, according to different applications and embodiments. These variations do not influence the principal function of the pump device. Preferably, the membrane is formed of a homogenous material whose thickness is greatest at a region thereof across from said outlet opening.

The operation of the pump device is characterized as follows. Through the channel 6 in the primary part 2 of the pump house, pressure pulses are induced with an overpressure of about 0.1 MPa and a regular frequency of the magnitude 0.5–1.0 Hz. A pressure pulse results in an approximately uniform extension of the membrane 3, which causes a rapid obstruction of the inlet openings 8 by the secondary side of the membrane. Further extension of the membrane has the effect that the fluid in the space 7 inside the pump house is forced out through the outlet opening 9. A hose 5 can be connected to this outlet. The total volume of the outlet opening and the hose ought to be essentially less than the volume of the space 7. When the pressure decreases and the membrane reverts to its initial position, i.e., engaged with the primary part of the pump house, there is at first some resuction of the forced-out fluid, which, however, ceases as soon as the inlet openings are reopened. To decrease the return of the fluid, the outlet opening or hose can be provided with a non-return valve.

FIG. 2 shows a preferred application of the invention for producing electrolyte circulation in a multicell accumulator battery. In FIG. 2 only two cells are shown, but in reality a battery can comprise more than 100 cells. Each cell comprises a jar 11 containing electrodes 12 and electrolyte 13. The pump device 14 according to the invention is located above the electrolyte surface 15 and has, in the example, been shown as installed in the lid of the battery. Thus, the inlet openings of the pump device will be disposed within the space over the electrolyte, while the hose 5, which is connected to the outlet opening 9 terminates near the bottom of the jar. The hose 5 can then be connected to devices for obtaining greatest possible electrolyte circulation. This arrangement avoids the need for sucking-in air from outside the jar to produce electrolyte circulation. Instead, there is only a circulation of the gas present in the respective jars.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A pump device for intermittently pressurizing a working fluid, comprising:
   a pump house having a primary portion and a secondary portion forming a space therebetween,
   said secondary portion being cup-shaped, an upper section of which containing at least one non-valved inlet opening for admitting working fluid to said space, and a bottom section of which containing a non-valved outlet opening for ejecting the admitted working fluid;
   said primary portion including means for introducing a control pressure fluid into said space;
   an elastic membrane supported on said primary portion and extending within said space to a level below said inlet opening to form a fluid-tight seal between said primary and secondary portions, said elastic member being cup-shaped and normally in a contracted condition and including:
   an inner surface facing said primary portion to be acted upon by control pressure fluid from the latter to expand said membrane, and
   an outer surface facing said secondary portion and being spaced therefrom in said contracted condition of said membrane to define a working space therebetween, the depth of said working space between said outer surface of said membrane and said secondary portion progressively increasing from said inlet opening to said outlet opening so that upon expansion of said membrane, said outer surface closes said inlet opening and progressively closes said working space toward said outlet opening to express working fluid therethrough.

2. A pump device according to claim 1, wherein said elastic membrane comprises a homogenous material having a thickness which is greater adjacent said outlet opening than adjacent said inlet opening.

3. A pump device according to claim 1, wherein said means for introducing control fluid comprises a passage in said primary portion which terminates at said space, and means for supplying regular frequency pressure pulses through said passage to intermittently expand said elastic membrane.

4. A battery system comprising:
   a jar,
   electrodes and electrolyte fluid in said jar,
   pumping means for circulating electrolyte between said electrodes and comprising:
   a pump house including a primary portion and a secondary portion forming a space therebetween, said secondary portion including a non-valved inlet communicating said space with an area above said electrolyte fluid and a non-valved outlet disposed below said inlet and communicating with said electrolyte below the level of said electrolyte,
   an elastic membrane extending within said space to a level below said inlet, said membrane including a secondary side facing said inlet and outlet and forming a working space together with said secondary portion when said membrane is in a contracted position,
   the depth of said working space between said membrane and said secondary portion progressively increasing toward said outlet, and
   means for expanding said membrane so that said secondary side initially closes said inlet and progressively closes said working space toward said outlet to express working fluid therethrough.

5. A battery system according to claim 4, wherein said displacing means comprises a passage in said primary portion terminating at said space, and means for supplying regular-frequency pressure pulses through said passage to intermittently expand said membrane.

* * * * *